United States Patent Office 3,008,816
Patented Nov. 14, 1961

3,008,816
METHOD AND COMPOSITION FOR
IMPROVING SOIL
John B. Hemwall, Long Beach, Calif., assignor to The
Dow Chemical Company, Midland, Mich., a corporation of Delaware
No Drawing. Filed Jan. 26, 1959, Ser. No. 788,760
13 Claims. (Cl. 71—1)

This invention relates to a method for improving arable soil generally, any soils intended for cultivation, and soils which are under cultivation, particularly, with respect to improving their usefulness in the growth of plant life and in making trace metals, such as iron, available to plants growing in those soils.

Many soils encountered in various parts of the world are naturally deficient with respect to certain trace elements, resulting either from depletion of certain trace metals in those soils or inhibition brought about by the use of large quantities of insecticides on plants in those soils. For example, frequently repeated use of copper insecticides will induce a condition in plants growing in those soils called copper induced iron chlorosis. Many soils in fact which have an ample quantity of iron present in the soil will develop a condition such that the iron is present in the soil only as highly insoluble inorganic compound, which, accordingly, is not available to the plant. This also produces a condition of iron chlorosis. A fundamental symptom of the iron chlorosis is pale green, yellowish foliage, poor growth, and, sometimes, even a certain amount of die-back of the plant.

Various treatments are available for correcting the iron deficiency, but such treatments as direct application of iron salts to the soil are ineffective, because the soluble iron salt in the soil quickly becomes insoluble iron hydroxide. Application of chelating agent, for example, as described in United States Patent 2,828,182 is useful for the partial solubilization of mineral soil components, but is insufficient for quick correction if the situation involves iron chlorosis.

Fundamentally, therefore, it is an object of this invention to provide a method and composition for controlled solubilization of insoluble metal compounds in soil and including such metals available to plants in soil in the vicinity of plant roots.

Other objects and advantages of the invention will in part be obvious and in part appear hereinafter.

We have found that iron may be efficiently added to soil and made immediately available to plants growing in soil in adequate amounts to satisfy the trace requirements of plants growing in the soil by adding the iron to the soil in the form of certain metal complexes. The advantage of adding the iron in the complex form is that it enters the soil in the form of a complex organic amino phosphonic acid compound, which compound is very efficient for holding the iron in solution over a very broad range of pH and, to the extent that the compound decomposes in soil, it makes available to the plant certain other elements of value to it, namely ammonia and phosphoric acid. To the extent the compound is not decomposed in the soil, on release of iron to the plant, the organic portion returns or stays in the soil and the inorganic soil components in which it is released are degraded to produce certain metal complexes which are water soluble sufficiently to render the metal ion itself available to the plant growing in the medium in which the exchange is occurring. Hence, the addition of the iron complexes formulated in accordance with this invention results in the production of conditions in the soil around the plant roots which make available to the plant traces of iron as well as other metal ions and elementary components needed in plant nutrition. The composition for use in or with a plant growth medium or fertilizer for such medium thus is characterized by being composed of the free chelating agent alone or admixed with the iron complex of a compound corresponding to the following drawing:

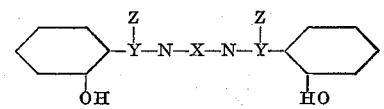

wherein X represents a central alkylene or cycloalkylene spacer group which spaces the indicated nitrogen atoms 2–3 carbon atoms apart and may be typically ethylene, trimethylene, methylethylene, dimethylethylene, and similar alkylene substituted ethylenes and trimethylenes, as well as cyclo hexylene and cyclo pentylene. The function of the X group in this structure is merely that of spacer and the degree of spacing preferred is 2–3 carbon atoms so that an optimum 5 or 6 member combination is available for forming the fused chelate ring when the compound reacts with the polyvalent metal.

Y represents a methylene spacer group interposed between the nitrogen and the phenyl group so that the hydroxyl group in the ortho position of the phenyl ring is available for chelation.

Z represents a phosphonic acid group in which the phosphorus is directly attached to a carbon of the Y spacer group, the phosphonic acid group being either the free acid, or the simple methyl, ethyl, propyl or butyl ester, in either the mono or the di ester form. High alkyl esters may be used, but no advantage is derived therefrom in that the function being sought is the chelation function and it is best obtained with the free acid, simple mono ester, the simple di ester, and the various alkali metal and ammonium base salts of the compound. Sodium, potassium and ammonium salts are most consistent with soil applications, though simple amine salts such as mono, di and triethanol amine salts may be used.

Polymers of the simple alkylene diamine used for the formation of the terminal salicyl groups may be used so that X may actually represent an alkylene N-alkylene structure in polymer form so that the ultimate compound is characterized by repetition of this internal form through 1, 2, 3 or 4 units, e.g., as follows:

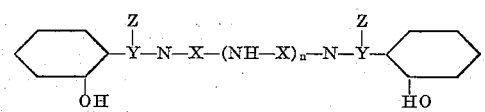

Typical compounds corresponding to the drawing given are the following:

(1) Ethylenebis (iminosalicylidene) di-phosphonic acid
  (a) Mono ethyl ester
  (b) Di ethyl ester
  (c) Tri ethyl ester
  (d) Tetra ethyl ester
  (e) Sodium, potassium and ammonium salts, in mono, di, tri and tetra form

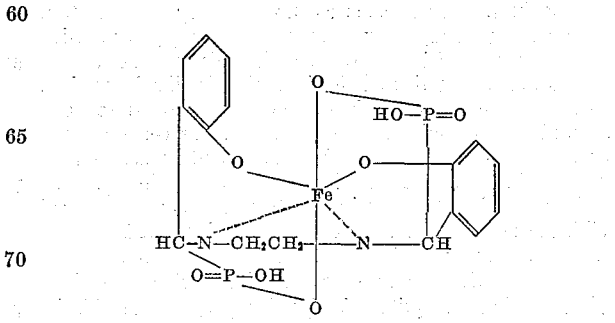

(2) Trimethylenebis (iminosalicylidene) di-phosphonic acid
    (a) Mono ethyl ester
    (b) Di ethyl ester
    (c) Tri ethyl ester
    (d) Tetra ethyl ester
    (e) Sodium, potassium and ammonium salts, in mono, di, tri and tetra form A structure for the iron chelate of the compounds may be postulated as follows:

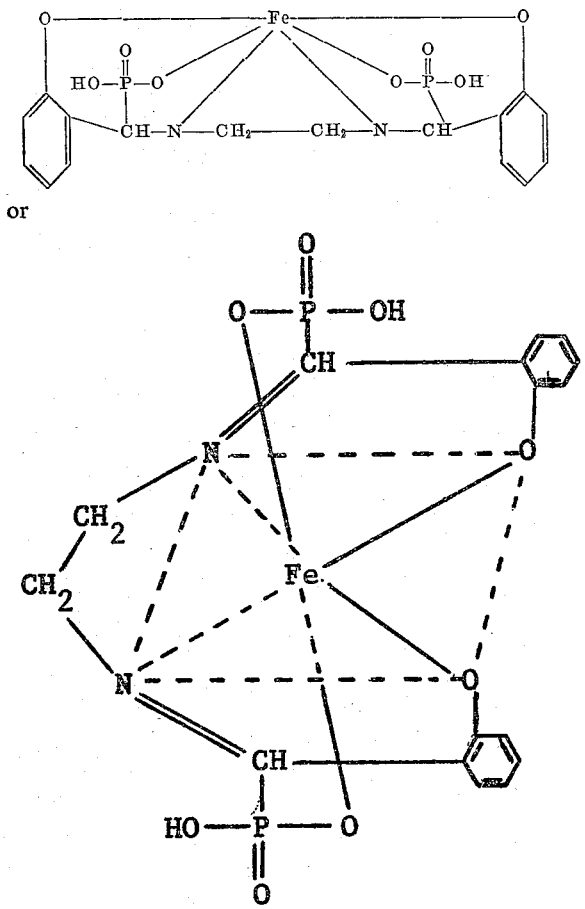

or

The composition may be added directly to the soil as a dry powder, or as a water solution, or as the iron chelate deposited on a carrier, such as vermiculite or sand or other inert material, or as a component of a fertilizer. It may also include a free chelating agent, the amount of free chelating agent, depending upon conditions, being as much as 100 percent of the material added to the carrier. The precise composition added to the soil may be varied to suit conditions. That is, the composition used may contain only a small amount of iron, or it may be a 1:1 iron chelate.

The addition to soil of small quantities of metal chelate-chelating mixture, results in development of unusual effects manifested in an improved growth of the plants in the medium. Plants, such as flax, corn, spinach, cotton, tomatoes, soybean, curly dock, are all sharply responsive to the soil treated in accordance with this invention.

The actual practice of the invention is like its testing; small quantities of the iron chelate are added to soils around plants, maintained in those soils at certain levels of concentration, and the effect on growth measured by determining the amount of up-take of iron in terms of ratio of the iron up-take in said treated soil as compared with the ratio of the up-take in such soil treated with an iron salt such as ferric chloride or ferric sulfate.

The organic chelating agents of the class described above which are quite effective for purposes of this invention are, generally speaking, stable against metabolism by the plant or by the bacteria occurring in the soil. They have a further advantage of forming stable water-soluble metal complexes which are essential for adequate plant growth, including the elements of calcium, magnesium, zinc, manganese, iron, copper, cobalt and others. Thus, when the chelating agent is added to the soil in the form of an iron complex, together with a certain amount of free chelating agent, the utilization of the iron releases a certain amount of the free chelating agent, which, then, in the soil becomes available for reacting with other inorganic metal compounds to render them available to the plants.

In the preparation of fertilizers and compositions for addition to soils having the advantages of this invention it should be recognized that the properties of the chelating agent-iron chelate mixture, or of the free chelating agents, or the iron chelating agent alone, may be obtained by adding the compounds as such to the soil. Techniques for application of the materials as a dry dust or a solution are well understood by those skilled in the art and need no elaboration. It is also possible to obtain the benefits of the composition by application to soil in a carrier which carrier may be sand or vermiculite as a diluent or it may be a fertilizer. Any commercial fertilizer of conventional type, characterized by its content of nitrogen, phosphorus, and potassium compounds may be used and benefited by the incorporation of a small proportion of the chelating composition in accordance with this invention. It is particularly valuable for incorporation into organic fertilizers such as those derived from sewage sludges. A typical one of this is the commercial Milorganite, which is an activated, dried sewage sludge.

Urea formaldehyde resins are a favored class of synthetic organic fertilizers and it is, of course, apparent that the chelating agents may be blended therewith in accordance with this invention.

To a fertilizer of whatever character is used, there is added at least enough of chelating agent corresponding to this invention to react with all of the trace metals present in such fertilizer. In general, this will be a minor quantity but nevertheless the effect of the addition of the chelate agent is to solubilize the metals. The basic formula to be followed in addition of chelating agent to the fertilizer, whatever its composition, is to incorporate it in amounts such that when the fertilizer is applied to soil at recommended levels, the accompanying amount of chelating agent or iron chelate-chelating agent mixture in accordance with this invention will be applied.

The amount of the iron chelate or chelating agent to be added to the soil may vary from about 0.0001 to about 0.1 percent by weight, or 0.1 to 1000 parts per million of the soil in which the plant is growing. Obviously, with a field grown plant, quantitative figures of this kind lose their meaning unless they are referred to a definite depth of soil. Accordingly, it may be assumed that wherever reference is made to field soil, it means a layer of soil six inches deep. Accordingly, in the application of the metal chelates under field conditions initial application is best calculated and referred to an active soil volume measured in such a fashion.

In testing the chelating agents and iron chelate compositions in accordance with this invention, the procedure was as follows:

The chelating agent X is formed and dissolved in water. In general, it is easiest in making iron chelate, to take the chelating agent solution and mix it with a ferric ammonium sulfate solution in a 1:1 molar ratio. In quantitative experimental work in measuring the iron up-take ratios it is our practice to label the iron with $Fe^{59}$. The iron chelate solutions were then added to the alkaline soil in which seedlings of a certain size were growing, in all cases maintaining plants in certain untreated soils as blanks for comparison. Various amounts of iron chelate were added. After two weeks growth in a soil medium thus treated the aerial portion of the plant was harvested and assayed for $Fe^{59}$. The results are expressed in the tabulation given hereinafter as the ratio in parts per million of iron in the plant to that obtained in plants with the free iron salt added to soil. Included in the data for comparison are tests conducted with ethylenediaminetetraacetic acid as representative of a known chelating agent useful for soil addition.

Table I

| Chemical Added to Soil | Uptake Ratio of Iron Plant | | | | | | |
|---|---|---|---|---|---|---|---|
| | Curly Dock | Flax | Corn | Spinach | Cotton | Tomato | Soybean |
| $FeCl_3$ | .07 | .09 | .43 | .16 | .12 | .19 | .15 |
| $FeNH_4(SO_4)_2$ | | | | | | 0.25 | |
| Ethylene [1] Diamine Tetraacetic Acid | 1.00 | 1.00 | 1.00 | 1.00 | 1.00 | 1.00 | 1.00 |
| Phosphonic Acid cpd. di ester form | 2.07 | 6.22 | 4.91 | 2.04 | 6.12 | 4.28 | 1.91 |
| tetra ester | | | | | | 2.50 | |
| free acid | | | | | | 2.82 | |

[1] On a relative scale, this was assigned the value of 1.

It will be apparent from the tabulation that the iron salt directly applied, typified by $FeCl_3$ is essentially ineffective in effecting iron uptake of the plants. Ethylene diamine tetra acetic acid is valued at unity in the table. On this scale, therefore, the compounds carrying the phosphonic acid group as defined herein are at least two times more effective than EDTA and about thirty times more effective than ferric chloride. Despite the fact that the data indicate individual differences among the effectiveness of the free acid, the di ester, and the tetra ester, it should be noted that it is better to consider the effectiveness of the compounds as being of the same order of magnitude. That is, consistently, with a variety of plants such as the seven representative ones listed, the effectiveness of the compounds at least doubled that of EDTA and generally considerably exceeded this level.

In the copending application, Serial No. 777,571, by Albert E. Frost, assigned to the same assignee, the synthesis and identification of a family of compounds useful for purposes of this invention are described.

Though the invention has been described with reference to only a limited number of examples, it is to be understood that variants thereof may be adopted without departing from its spirit or scope.

What is claimed is:
1. The method of enhancing the growth of plants in soil which comprises, adding to the soil in which the plant is growing a small amount of an iron chelate of a chelating composition corresponding to the following:

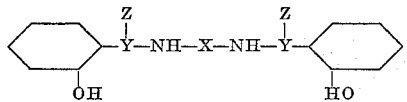

wherein, X represents a central spacer moiety selected from the group consisting of alkylene and cycloalkylene radicals which interpose 2–3 carbon atoms between the indicated nitrogen atoms; Y represents a methylene spacer group; Z represents a phosphonic acid moiety in which the phosphorus atom is directly attached to a carbon atom of the Y group, the said phosphonic acid moeity being selected from the group consisting of the free acid, and alkali metal and ammonium base salts, and esters of said phosphonic acid in which the alkyl group of said ester contains 1–18 carbon atoms, and maintaining the amount of said composition at a level of about 0.01 to 100 parts per million of chelated iron in the soil.

2. The method in accordance with claim 1 in which the chelating agent is ethylenebis-(iminosalicylidene) diphosphonic acid.

3. The method in accordance with claim 1 in which the chelating agent is a diethyl ester of ethylenebis(iminosalicylidene) diphosphonic acid.

4. The method in accordance with claim 1 in which the chelating agent is the tetra ethyl ester of ethylenebis-(iminosalicylidene) diphosphonic acid.

5. The method in accordance with claim 1 in which the chelating agent is a sodium salt of ethylenebis-(iminosalicylidene) diphosphonic acid.

6. The method in accordance with claim 1 in which the chelating agent is an ammonium base salt of ethylenebis-(iminosalicylidene) diphosphonic acid.

7. A composition for application to soils to enhance the growth of plants which comprises, a carrier selected from the group consisting of inorganic carriers, inorganic fertilizers, urea formaldehyde polymers, and organic fertilizers derived from fermented organic materials, and an iron chelate of a chelating composition corresponding to the following drawing:

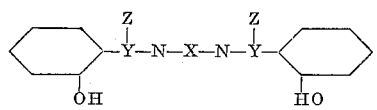

wherein, X represents a central spacer moiety selected from the group consisting of alkylene and cycloalkylene radicals which interpose 2–3 carbon atoms between the indicated nitrogen atoms; Y represents a methylene spacer group; Z represents a phosphonic acid moiety in which the phosphorus atom is directly attached to a carbon atom of the Y group, the said phosphonic acid moiety being selected from the group consisting of the free acid, and alkali metal and ammonium base salts, and esters of said phosphonic acid in which the alkyl group of said ester contains 1–18 carbon atoms.

8. The composition in accordance with claim 7 in which the amount of said agent is in the range from 0.1 percent to 5 percent by weight.

9. The composition in accordance with claim 7 in which the chelating agent is ethylenebis-(iminosalicylidene) diphosphonic acid.

10. The composition in accordance with claim 7 in which the chelating agent is a diethyl ester of ethylenebis-(iminosalicylidene) diphosphonic acid.

11. The composition in accordance with claim 7 in which the chelating agent is the tetra ethyl ester of ethylenebis-(iminosalicylidene) diphosphonic acid.

12. The composition in accordance with claim 7 in which the chelating agent is a sodium salt of ethylenebis-(iminocsalicylidene) diphosphonic acid.

13. The composition in accordance with claim 7 in which the chelating agent is an ammonium base salt of ethylenebis-(iminosalicylidene) diphosphonic acid.

References Cited in the file of this patent
UNITED STATES PATENTS 2,808,435    Young _____ Oct. 1, 1957
2,830,887    Bersworth _____ Apr. 15, 1958

OTHER REFERENCES

Nature-Ethylene Diamene-Tetra (Methylene Phosphonic Acid), August 11, 1956, vol. 178, pages 321–322.